(12) United States Patent
Cerbini et al.

(10) Patent No.: US 7,225,476 B2
(45) Date of Patent: Jun. 5, 2007

(54) PROTECTIVE CLOTHING AGAINST BIOLOGICAL AGENTS

(75) Inventors: Stefano Cerbini, Pesaro (IT); Pasqualino Lo Ioco, Cesena (IT)

(73) Assignee: CL.COM SRL, Forli (IT)

( * ) Notice: Subject to any disclaimer, the term of this patent is extended or adjusted under 35 U.S.C. 154(b) by 439 days.

(21) Appl. No.: 10/495,787

(22) PCT Filed: Nov. 12, 2002

(86) PCT No.: PCT/IT02/00719

§ 371 (c)(1), (2), (4) Date: May 17, 2004

(87) PCT Pub. No.: WO03/041807

PCT Pub. Date: May 22, 2003

(65) Prior Publication Data

US 2005/0042400 A1    Feb. 24, 2005

(30) Foreign Application Priority Data

Nov. 15, 2001  (IT) .......................... PS2001A0029

(51) Int. Cl.
*A41D 13/02* (2006.01)
(52) U.S. Cl. ................... 2/457; 2/79; 2/901; 442/398
(58) Field of Classification Search ............ 2/901, 2/456, 457, 79, 455, 69, 82, 85, 87, 48, 51, 2/93, 114; 442/394, 395, 398; 428/515, 428/516, 517

See application file for complete search history.

(56) References Cited

U.S. PATENT DOCUMENTS

| 4,833,010 A | * | 5/1989 | Langley ...................... 442/396 |
| 4,855,178 A | | 8/1989 | Langley |
| 4,924,525 A | * | 5/1990 | Bartasis .......................... 2/457 |
| 5,035,941 A | * | 7/1991 | Blackburn .................. 442/398 |
| 5,059,477 A | | 10/1991 | Henriksen |
| 5,509,142 A | * | 4/1996 | Connell et al. ................... 2/79 |
| 5,560,974 A | * | 10/1996 | Langley ...................... 428/198 |
| 5,626,947 A | * | 5/1997 | Hauer et al. ............. 428/195.1 |
| 5,662,978 A | | 9/1997 | Stokes et al. |
| 5,960,475 A | * | 10/1999 | Fewtrell .......................... 2/82 |

FOREIGN PATENT DOCUMENTS

| EP | 0 360 208 | 3/1990 |
| EP | 0 933 198 | 8/1999 |
| WO | WO 93 24321 | 12/1993 |

\* cited by examiner

*Primary Examiner*—A. Vanatta
(74) *Attorney, Agent, or Firm*—Young & Thompson

(57) ABSTRACT

The invention relates to overalls, manufactured by polypropylene and polyethylene, usable as protective clothing, in particular suitable as barrier against biological agents. The overalls provide a very high level of protection against the penetration of liquids and microorganisms, excellent mechanical properties, including tear and abrasion resistance, outstanding softness, drapeability and comfort.

6 Claims, 2 Drawing Sheets

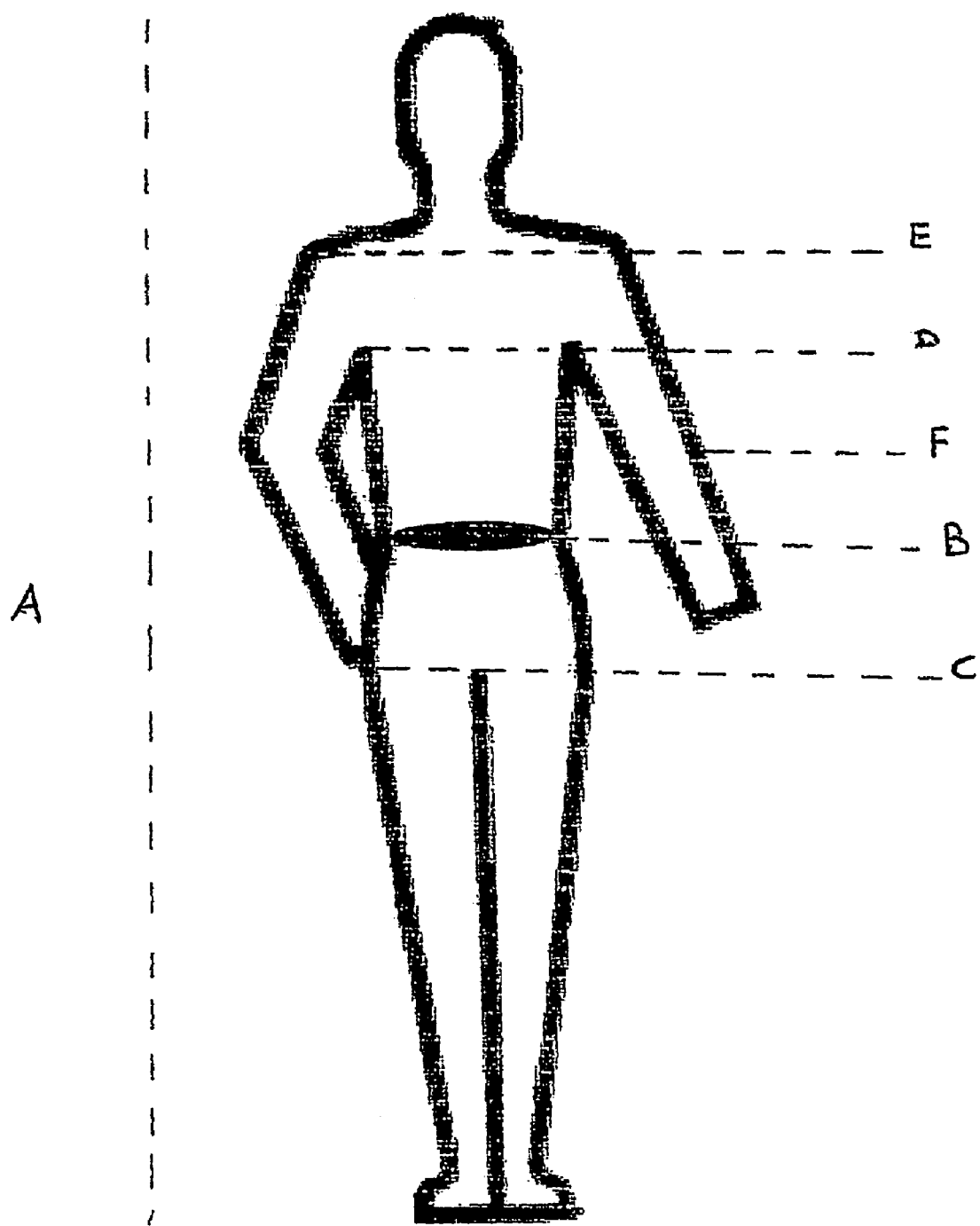
Fig n. 1

**PROTECTIVE OVERALLS 626 LINE CL.1
PROTECTIVE CLOTHING OF III CLASS**
CE 0624
CL.COM SRL
POLYPROPILENE AND POLYETHYLENE
OVERALLS
Unit weight gr 64.5/mq
Biological Protective Clothing
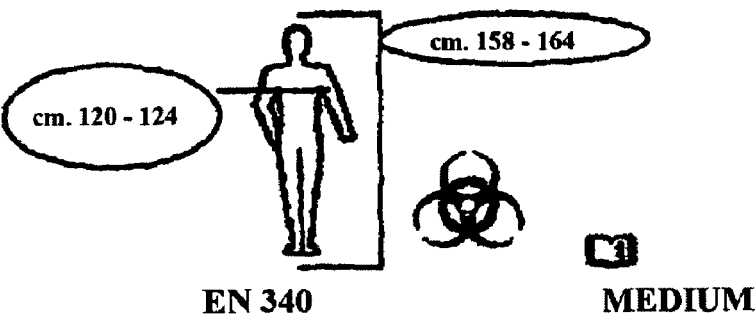
EN 340                                    MEDIUM
Disposable clothing NOT subject to
maintenance and to cleaning as it
CANNOT be reused.
Fig n. 2

PROTECTIVE CLOTHING AGAINST BIOLOGICAL AGENTS

FIELD OF THE INVENTION

The present invention refers to overalls suitable for the protection against biological agents.

PRIOR ART

There are several situations where workers are exposed to infective biological agents, that is micro-organisms, including those which have been genetically modified, which may be able to provoke infection, allergy or toxicity.

In some situations, e.g. microbiological laboratories and biotechnological productions, the infective agents are usually well known.

In other types of work, the agents the workers are exposed may not be known and only possible risks can be assessed; this happens, for example, in agriculture works, waste treatments, in particular hospital wastes, veterinary laboratories, emergency clean-up.

In all these circustances, protective clothing are necessary to prevent the infective agent from reaching the skin.

Protective clothing can be made by reusable materials as well as by single-use materials.

A great many materials and manufacturing technologies have evolved in an attempt to meet the criteria for a safe, effective and confortable protective barrier.

Concerning reusable materials, from early 20$^{th}$ century until the early 1970s, several evolving fabrics were used, starting from cotton woven which, since it is readily permeable, does not possess any liquid-resistance capability, moving to a polyester and cotton blended sheeting with improved mechanical properties and then to tightly woven cotton or polyester and cotton blended fabric with a water repellent chemical finish.

In the 1980s, a new generation of textiles was developed such as tightly woven fabric made of continuos filament yarns, in some cases made of very fine filaments (microfibers), which can be chemically finished and may be calendered to enhance liquid penetration resistance.

All the above woven fabrics rely on the interlocking geometry to provide integrity and protective barrier.

Single-use protective clothes are commonly constructed of nonwoven materials, which rely on fiber bonding technologies (thermal, chemical or physical) to provide integrity and strength.

The basic raw materials are various forms of natural (for example cotton and wood pulp) and synthetic fibers (for example polyester and polyolefin).

Fabrics can be engineered to achieve desired properties by the use of particular fiber types, bonding processes and fabric finishes.

In summary, fibers can be bonded mechanically, by high-velocity water jets which entangle the fibers (spunlace), thermally, by in-line melt spinning (spunbond), or chemically, by chemical binders (wet laid).

Typically, spunbond fabrics are made of polyolefins.

Both reusable and single-use products are often reinforced to enhance or improve their properties; for particular applications, additional materials are often added (overall or zoned) in the form of additional layers of materials, coatings, reinforcements or laminates.

In particular, a second layer of fabric is sometimes used to improve resistance to liquid penetration and skid resistance or chemicals are used to provide reinforcements and liquid-proof characteristics.

Various protective clothes obtained by the above processes have been described: for example in EP 0 365 559 B1 (priority GB 8714535).

Polyethylene is one of the most used materials, produced in several types for different applications.

Among others, Tyvek brand protective material is a spundbonded olefin manufactured from very fine continues filaments of high-density polyethylene bonded together by heat and pressure.

These materials are described, for example, in EP 850330 and U.S. Pat. No. 4,321,781.

In particular, there are also overalls manufactured by these materials, which possess very high liquid, powder and chemical resistance but are not so efficient in terms of tear and abrasion resistance as well as in terms of drapeability, softness, flexibility and breathability.

All these aspects are as important as the barrier properties considering that the barrier materials should be strong enough to withstand the stresses encountered during typical use and that properties related to comfort are of primary importance in very critical working situations.

Consequently there is a continues need of finding new protective clothing with improved effectiveness in providing the appropriate level of protection against the penetration of liquids and microorganisms and, at the same time, in providing other important performance properties including mechanical resistance and comfort.

SUMMARY

Now we have found new overalls manufactured by polypropylene and polyethylene usable as protective cloth, in particular as barrier against biological agents.

The overalls provide a very high level of protection against the penetration of liquids and microorganisms, excellent mechanical properties, including tear and abrasion resistance, outstanding softness, drapeability and comfort.

DESCRIPTION OF THE INVENTION

The invention relates to overalls suitable for the protection against biological agents.

The overalls consist in a layer of nonwoven material in polypropylene laminated with a polyethylene film, wherein the ratio in unit weigth between polypropylene and polyethylene ranges from 70:30 to 50:50, preferably from 65:35 to 55:45.

The overalls are typically made of a layer of nonwoven polypropylene, having thickness ranging between 240 and 270 microns and unit weigth ranging between 35 and 45 g/m$^2$, laminated with a polyethylene film having thickness ranging between 30 and 70 microns and unit weigth ranging between 20 and 30 g/m$^2$.

The total thickness of the material is in the range 270–340 microns while the unit weigth ranges between 55 and 75 g/m$^2$.

In particular, the overalls are preferably made of a layer of nonwoven polypropylene, having thickness in the range 245–255 microns and unit weigth ranging between 37.5 and 40.0 g/m$^2$, laminated with a polyethylene film having thickness ranging between 40 and 60 microns and unit weigth ranging between 22.5 and 27.5 g/m$^2$; the preferred thicknees of the overalls is in the range 285–315 microns while the unit weigth ranges between 60.0 and 67.5 g/m².

The inner layer consists in a nonwoven spunbonded material made up of continuos filaments of polypropylene.

The inner layer, besides providing a barrier against liquids and microorganisms, ensures high drapeability and comfort and, in addition, is physiologically safe and breathable.

The outer layer is made of a microporous polyethylene film with pore size low enough to prevent the passage of liquids and microorganisms but, at the same time, to allow moisture to pass on a molecular level, so ensuring a good breathability.

The combination of the two materials in the respective forms and in the appropriate ratios, provides a combination of chemical-physical properties and of drapeability and comfort never reached with the overalls until now known.

In particular, the softness of the material, which ensures the high drapeability and the excellent comfort in any situation, does not negatively affect the barrier properties against liquids and microorganisms, which, on the contrary, turn out to be equivalent or superior in comparison to the known materials with higher density.

Furthermore, the tear and abrasion resistance are strong enough to withstand the stresses encounterd during any critical condition of use.

The overalls have been designed to comply with the specific requirements of the existing rules, in particular to comply with the Directive 686/89 CE (Italian D.L.475 -Dec. 4, 1992).

The forge ensures the protection of parts of the body, in particular of the neck, the chest, the arms and the legs.

The overalls must be worn together with gloves and other protective apparel in order to ensure the protection of hands, face and feet.

The overalls are equipped with hood and with rubber bands round the wrists, the ankles, the waist and the face.

In particular, rubber bands perfectly stick to the wrists and to the ankles in order to isolate arms and legs from contact with potential hazards.

All the joining parts are assembled by heat welding; the seams ensure an high barrier, equivalent to the material's one, The fastening means are in the front side and the zippers are covered by an adhesive band which ensures an hermetic seal.

The overalls are fabricated and designed to avoid area which could irritate or adversely affect the user.

The overalls are fabricated in several sizes in order to be comfortable for any worker in any working situations; the rubber band round the waist prevents the cloth from swelling so reducing the risk of interactions with external parts which could damage the overalls.

The shape of the overalls is reported in FIG. 1.

The dimensions, in cm, of the different sizes comply with the EN 340 rule and are listed in the following table, with references to FIG. 1 and with a tolerance of +/-3%.

|  | Size | | | |
| --- | --- | --- | --- | --- |
|  | Medium | Large | XL | XXL |
| Total length (A) | 161 | 162 | 172 | 176 |
| Waist circumference (B) | 120 | 124 | 139 | 142 |
| Pelvis circumference (C) | 132 | 136 | 140 | 142 |
| Thorax circumference (D) | 122 | 130 | 142 | 146 |
| Shoulder width (E) | 61.5 | 61.5 | 65 | 66 |
| Sleeves length (F) | 57.8 | 57.5 | 59 | 61 |

The process of manufacture is based on the standard rules for manufacturing of protective clothing.

The material is cut and hollow punched, the different parts are selected on the basis of the different size and are then marked by numbers.

The dimensions of the different parts are then checked and the overalls are manufactured by heat welding the different components.

A label is then applied inside the overalls.

The label, besides the producer's name, contains, among others, the model name, the size, the pictogram "biological hazard".

In particular, the clothing is marked in accordance with the European Standard (CE) for protective clothing against biological agents.

The information for the user are worded clearly and unambiguosly and the CE marking is clearly evident to guarantee the accordance with the fundamental safety requirements; an example of label is reported in FIG. 2.

The words, the ideograms and the pictograms are black on a white background, the dimensions of the letters are greater than 2 mm and the dimensions of the CE words are greater than 10 mm.

At the end of the manufacturing process, controls are carried out to check that all the parts have been correctly assembled and that the superimposition of the different layers as well as the composed structures are in compliance with the operative instructions.

In particular, the seal of the welded area, the marking conformity amd the marking position are checked.

Finally, in order to protect the cloth untill the moment of use, it is folded, tacked, the information are inserted and the overalls are packed.

The so manufactured overalls are suitable for the protection against biological agents as bacteriae, parasites, fungi and viruses.

The overalls are effective against any microorganisms, including whose which have been genetically modified, cell cultures and human endoparasites, which may be able to provoke any infection, allergy or toxicity.

In particular, the overalls are effective against microorganisms that can be transmitted by blood and body fluids, such as Hepatitis B Virus (HBV), Hepatitis C Virus (HCV), Human Immunodeficiency Viruses (HIV), against the agents responsable for BSE and other TSE, and against the *Bacillus Anthracis*.

The overalls can be used in any situation in which the workers are possibly exposed to different kind of dangerous substances in various forms, like liquids, air, aerosols or solids.

Examples of work situations with risk of exposure to infective agents are the biotechnological productions, the work in health care (including isolation and post-mortem units), the work in chemical-biological, veterinary, diagnostic laboratories, the work in refuse disposal plants, the activities where there is contact with animals and/or products of animal origin.

The overalls ensure only the protection of the parts of human body directly covered and must be used in combination with other protective clothing in order to provide a complete protection (for example, with breathing masks, gloves, boots).

The overalls may be worn over the usual working clothes and their effectiveness is guaranteed only if it is correctly worn, fastened and of appropriate size.

The overalls are sinlge-use clothes and can not undergo any kind of maintenanance, washing or reuse.

Hereinafter the results of some tests, carried out to evaluate the technical properties of the overalls, are reported. Such results have only illustrative aim and they do not imply any limitation.

Barrier Properties

The primary performance of a protective clothing is the effectiveness in providing the appropriate level of protection against the penetration of microorganisms.

Liquids are generally accepted as the most important vector of microbiological transport but other possible vectors include air and aerosols; in addition, also dry penetration of microorganisms promoted by mechanical action may also be possible.

Consequently, an effective microbial barrier must be resistant to both wet and dry penetration of microorganisms.

A series of tests (tests 1–3) have been carried out to determine the barrier properties of the overalls of the present invention.

Test 1

Resistance to Penetration by Contaminated Liquids under an Hydrostatic Pressure

The test measures the resistance of materials to penetration by blood-borne pathogens using a surrogate microbe under conditions of continuos liquid contact.

The test is divided in two parts:
a) the material is subjected to successive increasing levels of pressure, using synthetic blood which simulates blood and other body fluids; penetration of the synthetic blood through the material is observed visually. Part a) is used as a screening test.
b) the resistance of the material to penetration by a surrogate microbe is measured, the surrogate microbe being a microorganism which acts as simulant for other microorganisms which are pathogenic to humans.

The synthetic blood simulates body fluids; many factors can affect the wetting and penetration characteristics of body fluids, such as surface tension, viscosity and polarity of the fluid.

The surface tension range for blood and body fluids (excluding saliva) is approximately 0.042–0.060 N/m.

The surface tension of the simulant is adjiusted to approximate the lower end of this surface tension range, that is 0.042 (+/−0.002) N/m.

The surrogate microbe used in the test is the Phi-X174 Bacteriophage, which is not pathogenic to humans but serves to simulate viruses that are pathogenic to humans.

It is one of the small known viruses, having diameter 0.027 microns, and is similar in size and shape to HCV, the smallest pathogen of blood with diameter 0.03 microns. Consequently, the Phi-X174 Bacteriophage also serves as a surrogate for HBV (0.042 microns) and HIV (0.10 microns)

Test Results:

1a) Screening Test-Resistance to Synthetic Blood

This test method covers the determination of the resistance of protective material to penetration by biological liquids, using synthetic blood at different levels of hydrostatic pressure.

The test is based on ASTM F 1670 and is used a screening test.

The test has been run on three specimens of 75 mm×75 mm, taken at random, at a temperature of 25(+/−5)° C., with 52% relative humidity and each pressure is hold for 5 minutes.

The penetration of the synthetic blood through the material has been observed visually for each specimen at the different pressures and pass (P) has been recorded in case of absence of penetration while fail (F) has been recorded in case of penetration.

The results were the following:

| Pressure (Kpa) | Specimen 1 | Specimen 2 | Specimen 3 |
|---|---|---|---|
| 0 | P | P | P |
| 1.75 | P | P | P |
| 3.50 | P | P | P |
| 7.00 | P | P | P |
| 14.00 | P | P | P |
| 20.00 | P | P | P |

1b) Test Method for Resistance to Penetration by Infective Agents Using Phi-X174 Bacteriophage The test is used to measure the resistance of protective materials to penetration by infective agents, using the bacteriophage Phi X-174 as a test system.

The test only applies to materials that pass the screening test a) and is based on ASTM F 1671.

Three 75 mm×75 mm specimens taken at random from the material were tested.

The specimens were subjected to a nutrient broth, contaning the virus, to which successive pressure levels were applied for 5 minutes each at a temperature of 21(+/−5)° C.

Detection of penetration of the microorganism at each level was carried out even when liquid penetration was not visible.

The specimen passes the test when the pfu/ml (plaque forming units per milliliter) which penetrate through the specimen at a given pressure are <1; the material pass the test at a given pressure level when all three specimens pass.

The results were the following:

| Pressure | Specimen 1 | Specimen 2 | Specimen 3 |
|---|---|---|---|
| 14.00 Kpa | 0 UPF/ml | 0 UPF/ml | 0 UPF/ml |

Test 2

Resistance to Penetration by Biologically Contaminated Aerosols

The test has been carried out by a Perspex box with Collison atomiser.

A solution, containing the microorganism Staphylococcus Aureus ATCC 6538 (NCIMB 9518) has been sprayed into the box. Underpressure is used to collect the droplets of the contaminated aerosol on two membrane filters. One of these filters has been shielded by the protective clothing material.

Then filters were removed, microorganisms were extracted and, after incubation overnigth at 37° C., were counted.

The ratio of bacteriae found on the shielded and the unshielded filter was used to assess the barrier properties of the protective clothing material.

Four specimens (25 mm diameter circles) were tested for 7 minutes.

The result in terms of microorganisms penetrated through the material was the following:

| Specimen 1 | Specimen 2 | Specimen 3 | Specimen 4 |
|---|---|---|---|
| 0% | 0% | 0% | 0% |

Test 3

Resistance Against Penetration by Biologically Contaminated Dust

The test is based on EDANA method 190.0-89/'96.

A powder has been contaminated with spores of *Bacillus Subtilis* ATCC 9372 (CIP A4); then it was vibrated through the protective clothing material for 30 minutes.

The number of microorganisms penetrated through the material was counted after 24 hours incubation at 35° C.

The test was carried out on six 200 mm×200 mm specimens, one of which used as an uncontaminated control.

The results were as follows:

|  | Specimen | | | | | |
| --- | --- | --- | --- | --- | --- | --- |
|  | 1 | 2 | 3 | 4 | 5 | Ref. |
| Microorganisms | 0 | 0 | 0 | 0 | 0 | 0 |

Mechanical Properties

Other properties are important in order to assess the performances of the material, such as the ability to withstand the mechanical stresses encountered during typical use that could damage the material and that would consequently impact the required barrier performance.

Some tests (tests 4–8) have been carried out to assess the mechanical properties of the tuta.

Test 4

Abrasion Resistance

The abrasion resistance was determined using 00 abrasive paper by the Martindale method and a J. Heal apparatus.

Four specimens were tested at 20 (+/−2)° C., 65% relative humidity with 9 Kpa pressure until the formation of the first 0.5 mm diameter hole in the material (assessed by stereomicroscope), Results are expressed in terms of cycles necessary for the formation of the first hole:

|  | Specimen | | | | |
| --- | --- | --- | --- | --- | --- |
|  | 1 | 2 | 3 | 4 | Average |
| Cycles | 2880 | 3300 | 2500 | 2500 | 2795 |

The method classifies the materials in 4 classes, the highest classification, level 4 (>500 cycles), denoting materials with the highest abrasion resistance.

Consequently, according to the test, the material of the present invention shows the highest resistance to damage during use.

Hereinafter a list of results is reported based on tests run to assess other mechanical properties.

Test 5

Tear Resistance

Trapezoidal method-UNI EN ISO 9073/'99

Tearing strength in longitudinal direction=59.4(+/−10.1) N

Tearing strength in transversal direction=35.2(+/−5.7) N

Test 6

Flex Cracking Resistance

Method ISO 7854/'84

The specimens do not show any damage at 10× untill 100.000 cycles

Test 7

Tensile Resistance

Grab method ISO 5082/'82

Average breaking strength=73.2(+/−11.6)N

Test 8

Puncture Resistance

Method UNI EN 863/'96

Puncture resistance=12.4 N

Resistance to Ignition

There are many potential ignition sources in the normal use of the overalls.

All materials will burn if a high-intensity heat source is applied to them, especially in the presence of elevated oxygen levels.

A test was run to assess the flame resistance of the overalls of the present invention.

Test 9

Flame Resistance

The test is based on EN 1146/'67 method, using a 40 mm high flame, with a temperature of 800(+/−50)° C., obtained by propane gas and by a bunsen according to the EN/532/'94 rule.

Five specimens were assessed without evidence of any post-combustion or post-incandescence.

Resistance Against Chemicals

The material, during the normal use, may come into contact with chemical agents such as clinical liquids, skin disinfectants, lubricants, oils.

As these chemicals can damage the material with consequent influence on the barrier properties, it is of primary importance that the protective clothing has an appropriate resistance against chemicals.

A test was carried out using four different liquid chemicals.

Test 10

Resistance to the Penetration of Liquid Chemicals

The test is based on UNI EN 588 method.

Three specimens were tested using four different chemicals, at 20(+/−2)° C., 65% relative humidity, with a flow of 10 ml per 10(+/−1) secs.

Several parameters were assessed and the average values are listed below:

|  | Penetration (%) | Repellence (%) | Absorption (%) |
| --- | --- | --- | --- |
| $H_2SO_4$ 30% | 0 | 86.4 | 8.6 |
| NaOH 10% | 0 | 86.0 | 10.2 |
| n-heptane | 0 | 78.7 | 7.0 |
| isopropanol | 0 | 82.1 | 8.4 |

Resistance of Joining Areas

Finally, considering that the penetration of liquids can be easier in seams, joins and assemblages of protective clothing, a specific water penetration test was carried out in the joining areas.

Test 11

Resistance to Water Penetration Under Increasing Hydrostatic Pressure.

The test is based on UNI EN 20811/'93 method, using a Branca apparatus and increasing the pressure at a rate of 60 cm $H_2O$ per minute.

The results are expressed in cm H₂O and in Pa necessary to have the penetration of the first water drop through the material, in the joining positions.

5 specimens were tested and the lower values were recorded.

A) temp.: 20(+/−2)° C.; R.H.: 65%; water temp.: 20(+/−2)° C. result=293 cm H₂O-28733 Pa
B) temp.: 25(+/−2)°C.; R.H.: 55%; water temp.: 25(+/−2)° C. result=25.5 cm H₂O-2501 Pa

BRIEF DESCRIPTION OF THE DRAWINGS

In the accompanying drawings:

FIG. 1 is a diagram showing various portions of the body to which the protective clothing of the present invention is to be applied; and FIG. 2 is an example of the descriptive packaging to be applied to the protective clothing of the present invention.

The invention claimed is:

1. Overalls made of a material suitable for protecting against biological agents and exhibiting mechanical resistance properties, characterized in that said material is manufactured by the lamination of an inner layer of non-woven polypropylene with an outer layer of polyethylene film, the weight ratio between polypropylene and polyethylene ranging from 70/30 to 50/50, and in that the thickness of the material ranges between 270 and 340 microns and the unit weight ranges between 55 and 75 g/m².

2. Overalls as claimed in claim 1, characterized in that said ratio in unit weight between polypropylene and polyethylene ranges from 65:35 to 55:45.

3. Overalls as claimed in claim 1, characterized in that the inner layer of nonwoven polypropylene has thickness ranging between 240 and 270 microns and unit weight ranging between 35 and 45 g/m² and the outer polyethylene film has a thickness ranging between 30 and 70 microns and unit weight ranging between 20 and 30 g/m².

4. Overalls as claimed in claim 1, characterized in that the thickness of the material ranges between 285 and 315 microns and the unit weight ranges between 60.0 and 67.5 g/m².

5. Overalls as claimed in claim 1, characterized in that the inner layer of nonwoven polypropylene has a thickness ranging between 245 and 255 microns and unit weight ranging between 37.5 and 40.0 g/m² and the outer polyethylene film has a thickness ranging between 40 and 60 microns and unit weight ranging between 22.5 and 27.5 g/m².

6. Overalls as claimed in claim 1, wherein the outer layer is a microporous polyethylene film with pore size low enough to prevent the passage of liquids and microorganisms but at the same time to allow moisture to pass therethrough, thereby to ensure good breathability.

* * * * *